United States Patent
Wein et al.

(10) Patent No.: US 9,898,551 B2
(45) Date of Patent: Feb. 20, 2018

(54) FAST ROW TO PAGE LOOKUP OF DATA TABLE USING CAPACITY INDEX

(71) Applicants: David Wein, St. Paul, MN (US); Ivan Schreter, Malsch (DE)

(72) Inventors: David Wein, St. Paul, MN (US); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 385 days.

(21) Appl. No.: 14/553,878

(22) Filed: Nov. 25, 2014

(65) Prior Publication Data

US 2016/0147904 A1     May 26, 2016

(51) Int. Cl.
*G06F 17/30*     (2006.01)
*G06F 12/08*     (2016.01)
*G06F 12/0817*     (2016.01)

(52) U.S. Cl.
CPC .... *G06F 17/30952* (2013.01); *G06F 12/0817* (2013.01); *G06F 17/30312* (2013.01);
(Continued)

(58) Field of Classification Search
CPC ......... G06F 17/30345; G06F 17/30952; G06F 17/30321; G06F 17/30864; G06F 17/30917; G06F 17/30926; G06F 17/30938; G06F 17/30946; G06F 17/30625; G06F 17/30949; G06F 17/30961; G06F 17/30988;
(Continued)

(56) References Cited

U.S. PATENT DOCUMENTS 5,222,235 A * 6/1993 Hintz ................ G06F 17/30312
5,594,898 A * 1/1997 Dalal ................ G06F 17/30321
                                                             707/696
(Continued)

FOREIGN PATENT DOCUMENTS

EP        2778961 A1    9/2014
WO    WO-0129690 A2    4/2001

OTHER PUBLICATIONS

"Nbit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

(Continued)

*Primary Examiner* — Srirama Channavajjala
(74) *Attorney, Agent, or Firm* — Mintz Levin Cohn Ferris Glovsky and Popeo, P.C.

(57) ABSTRACT

The subject matter disclosed herein provides methods for determining the page on which a desired row position value is located. A table having a plurality of rows can be accessed. The rows can be distributed across one or more pages in an in-memory database. Each row can be associated with a unique row position value. Each page can be associated with a capacity that is representative of an amount of data stored on the page. A capacity index having a plurality of entries can be created to record changes in capacity between pages. Neighboring entries in the capacity index can have a different capacity. Each entry in the capacity index can correspond to a page. A page directory can be created based on the capacity index. The page directory can indicate all possible row position values associated with each page. Related apparatus, systems, techniques, and articles are also described.

20 Claims, 10 Drawing Sheets

(52) U.S. Cl.
CPC .. *G06F 17/30321* (2013.01); *G06F 17/30327* (2013.01); *G06F 17/30424* (2013.01); *G06F 17/30595* (2013.01)

(58) Field of Classification Search
CPC ......... G06F 17/30622; G06F 17/30327; G06F 12/123; G06F 12/0292; G06F 12/1466; G06F 17/30595; G06F 17/30312; G06F 17/30424; G06F 12/0817; G06F 12/1009
See application file for complete search history.

(56) References Cited

U.S. PATENT DOCUMENTS

| | | | |
|---|---|---|---|
| 5,701,480 A | 12/1997 | Raz | |
| 5,717,919 A | 2/1998 | Kodavalla et al. | |
| 5,758,145 A * | 5/1998 | Bhargava | G06F 17/30327 707/744 |
| 5,794,229 A | 8/1998 | French et al. | |
| 5,870,758 A | 2/1999 | Bamford et al. | |
| 5,933,833 A * | 8/1999 | Musashi | G06F 17/245 |
| 6,275,830 B1 | 8/2001 | Muthukkaruppan et al. | |
| 6,282,605 B1 * | 8/2001 | Moore | G06F 3/0614 707/999.003 |
| 6,490,670 B1 | 12/2002 | Collins et al. | |
| 6,606,617 B1 * | 8/2003 | Bonner | G06F 17/30318 |
| 6,668,263 B1 * | 12/2003 | Cranston | G06F 17/30595 |
| 6,754,653 B2 | 6/2004 | Bonner et al. | |
| 6,865,577 B1 * | 3/2005 | Sereda | G06F 17/3033 707/699 |
| 7,698,712 B2 | 4/2010 | Schreter | |
| 8,024,296 B1 | 9/2011 | Gopinathan et al. | |
| 8,161,024 B2 * | 4/2012 | Renkes | G06F 17/30336 707/705 |
| 8,364,648 B1 | 1/2013 | Sim-Tang | |
| 8,510,344 B1 | 8/2013 | Briggs et al. | |
| 8,650,583 B2 | 2/2014 | Schreter | |
| 8,732,139 B2 | 5/2014 | Schreter | |
| 8,768,891 B2 | 7/2014 | Schreter | |
| 9,058,268 B1 * | 6/2015 | Ostiguy | G06F 12/0802 |
| 9,098,522 B2 | 8/2015 | Lee et al. | |
| 9,141,435 B2 * | 9/2015 | Wein | G06F 9/5061 |
| 9,262,330 B2 | 2/2016 | Muthukumarasamy | |
| 9,268,810 B2 | 2/2016 | Andrei et al. | |
| 9,275,095 B2 | 3/2016 | Bhattacharjee et al. | |
| 9,275,097 B2 * | 3/2016 | DeLaFranier | G06F 17/30309 |
| 9,305,046 B2 | 4/2016 | Bhattacharjee et al. | |
| 9,372,743 B1 | 6/2016 | Sethi et al. | |
| 9,489,409 B2 | 11/2016 | Sharique et al. | |
| 2001/0051944 A1 | 12/2001 | Lim et al. | |
| 2002/0107837 A1 | 8/2002 | Osborne et al. | |
| 2002/0156798 A1 | 10/2002 | Larue et al. | |
| 2003/0028551 A1 | 2/2003 | Sutherland | |
| 2003/0065652 A1 * | 4/2003 | Spacey | G06F 17/30622 |
| 2003/0204534 A1 | 10/2003 | Hopeman et al. | |
| 2003/0217075 A1 * | 11/2003 | Nakano | G06F 17/30312 |
| 2004/0034616 A1 | 2/2004 | Witkowski et al. | |
| 2004/0054644 A1 | 3/2004 | Ganesh et al. | |
| 2004/0249838 A1 | 12/2004 | Hinshaw et al. | |
| 2005/0027692 A1 * | 2/2005 | Shyam | G06F 17/30321 |
| 2005/0097266 A1 | 5/2005 | Factor et al. | |
| 2005/0234868 A1 | 10/2005 | Terek et al. | |
| 2008/0046444 A1 | 2/2008 | Fachan et al. | |
| 2008/0247729 A1 * | 10/2008 | Park | G11B 20/10527 386/343 |
| 2009/0064160 A1 | 3/2009 | Larson et al. | |
| 2009/0094236 A1 | 4/2009 | Renkes et al. | |
| 2009/0254532 A1 | 10/2009 | Yang et al. | |
| 2009/0287737 A1 | 11/2009 | Hammerly | |
| 2010/0082545 A1 * | 4/2010 | Bhattacharjee | H03M 7/30 707/641 |
| 2010/0088309 A1 | 4/2010 | Petculescu et al. | |
| 2010/0287143 A1 | 11/2010 | Di Carlo et al. | |
| 2011/0087854 A1 | 4/2011 | Rushworth et al. | |
| 2011/0145835 A1 | 6/2011 | Rodrigues et al. | |
| 2011/0153566 A1 | 6/2011 | Larson et al. | |
| 2011/0302143 A1 | 12/2011 | Lomet | |
| 2012/0011106 A1 | 1/2012 | Reid et al. | |
| 2012/0047126 A1 | 2/2012 | Branscome et al. | |
| 2012/0102006 A1 | 4/2012 | Larson et al. | |
| 2012/0137081 A1 | 5/2012 | Shea | |
| 2012/0179877 A1 | 7/2012 | Shriraman et al. | |
| 2012/0191696 A1 * | 7/2012 | Renkes | G06F 17/30336 707/714 |
| 2012/0233438 A1 | 9/2012 | Bak et al. | |
| 2012/0265728 A1 | 10/2012 | Plattner et al. | |
| 2012/0284228 A1 | 11/2012 | Ghosh et al. | |
| 2013/0054936 A1 | 2/2013 | Davis | |
| 2013/0091162 A1 * | 4/2013 | Lewak | G06F 17/30392 707/769 |
| 2013/0097135 A1 | 4/2013 | Goldberg | |
| 2013/0346378 A1 | 12/2013 | Tsirogiannis et al. | |
| 2014/0025651 A1 | 1/2014 | Schreter | |
| 2014/0101093 A1 | 4/2014 | Lanphear et al. | |
| 2014/0214334 A1 | 7/2014 | Plattner et al. | |
| 2014/0279930 A1 | 9/2014 | Gupta et al. | |
| 2014/0279961 A1 | 9/2014 | Schreter et al. | |
| 2015/0039573 A1 | 2/2015 | Bhattacharjee et al. | |
| 2015/0089125 A1 | 3/2015 | Mukherjee et al. | |
| 2015/0113026 A1 | 4/2015 | Sharique et al. | |
| 2015/0142819 A1 | 5/2015 | Florendo et al. | |
| 2016/0103860 A1 | 4/2016 | Bhattacharjee et al. | |
| 2016/0125022 A1 | 5/2016 | Rider et al. | |
| 2016/0147445 A1 | 5/2016 | Schreter et al. | |
| 2016/0147447 A1 | 5/2016 | Blanco et al. | |
| 2016/0147448 A1 | 5/2016 | Schreter et al. | |
| 2016/0147449 A1 | 5/2016 | Andrei et al. | |
| 2016/0147457 A1 | 5/2016 | Legler et al. | |
| 2016/0147459 A1 | 5/2016 | Wein et al. | |
| 2016/0147617 A1 | 5/2016 | Lee et al. | |
| 2016/0147618 A1 | 5/2016 | Lee et al. | |
| 2016/0147750 A1 | 5/2016 | Blanco et al. | |
| 2016/0147776 A1 | 5/2016 | Florendo et al. | |
| 2016/0147778 A1 | 5/2016 | Schreter et al. | |
| 2016/0147786 A1 | 5/2016 | Andrei et al. | |
| 2016/0147801 A1 | 5/2016 | Wein et al. | |
| 2016/0147804 A1 | 5/2016 | Wein et al. | |
| 2016/0147806 A1 | 5/2016 | Blanco et al. | |
| 2016/0147808 A1 | 5/2016 | Schreter et al. | |
| 2016/0147809 A1 | 5/2016 | Schreter et al. | |
| 2016/0147811 A1 | 5/2016 | Eluri et al. | |
| 2016/0147812 A1 | 5/2016 | Andrei et al. | |
| 2016/0147813 A1 | 5/2016 | Lee et al. | |
| 2016/0147814 A1 | 5/2016 | Goel et al. | |
| 2016/0147819 A1 | 5/2016 | Schreter et al. | |
| 2016/0147820 A1 | 5/2016 | Schreter | |
| 2016/0147821 A1 | 5/2016 | Schreter et al. | |
| 2016/0147834 A1 | 5/2016 | Lee et al. | |
| 2016/0147858 A1 | 5/2016 | Lee et al. | |
| 2016/0147859 A1 | 5/2016 | Lee et al. | |
| 2016/0147861 A1 | 5/2016 | Schreter et al. | |
| 2016/0147862 A1 | 5/2016 | Schreter et al. | |
| 2016/0147904 A1 | 5/2016 | Wein et al. | |
| 2016/0147906 A1 | 5/2016 | Schreter et al. | |

OTHER PUBLICATIONS

"HANA database lectures—Outline Part 1 Motivation—Why main memory processing." Mar. 2014 (Mar. 2014). XP055197666. Web. Jun. 23, 2015.; URL:http://cse.yeditepe.edu.tr/~odemir/spring2014/cse415/HanaDatabase.pdf.

"HANA Persistence: Shadow Pages." Jun. 2013. *Yeditepe Üniversitesi Bilgisayar Mühendisliği Bölümü*. Web. Apr. 21, 2016. <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014. Web. Mar. 3, 2016.

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.

Jens Krueger et al. "Main Memory Databases for Enterprise Applications." Industrial Engineering and Engineering Management (IE

(56) References Cited

OTHER PUBLICATIONS

&EM), 2011 IEEE 18th International Conference on, IEEE, Sep. 3, 2011 (Sep. 3, 2011), pp. 547-557, XP032056073.
Lemke, Christian, et al. "Speeding Up Queries in Column Stores." *Data Warehousing and Knowledge Discovery Lecture Notes in Computer Science* (2010): 117-29. Web. Apr. 21, 2016.
Lu, Andy. "SAP HANA Concurrency Control." *SAP Community Network*. Oct. 28, 2014. Web. Apr. 22, 2016. <http://scn.sap.com/docs/DOC-57101>.
Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

* cited by examiner

FAST ROW TO PAGE LOOKUP OF DATA TABLE USING CAPACITY INDEX

TECHNICAL FIELD

This disclosure relates generally to database search techniques and, in particular, to search techniques that utilize changes in page capacity to quickly determine the page on which a desired row position value is located.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on storage media (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

In some examples of in-memory databases, a columnar table is composed of a delta part and a main part. The delta part receives changes to the table and stores these changes in a persistent log. Upon recovery, the delta part is rebuilt from the log. The columnar table may be stored as a chain of pages in the in-memory database, and each page in the chain can accommodate a different number of rows. Given these varying page capacities, it can be difficult to quickly find a data record having a desired row position value without examining the entire chain of pages.

SUMMARY

Methods and apparatus, including computer program products, are provided for determining the page on which a desired row position value is located.

In one aspect, a table having a plurality of rows is accessed. The rows are distributed across one or more pages in an in-memory database. Each of the rows is associated with a unique row position value. Each of the one or more pages is associated with a capacity. The capacity is representative of an amount of data stored on the page. A capacity index having a plurality of entries is created to record changes in capacity between pages. Neighboring entries in the capacity index have a different capacity. Each entry in the capacity index corresponds to one of the pages. A page directory is created based on the capacity index. The page directory indicates all possible row position values associated with each page in the table.

The above methods, apparatus, and computer program products may, in some implementations, further include one or more of the following features.

The page directory can be searched for a target row position value in any of the one or more pages. The searching can be performed using a binary search, a linear search, or a reverse linear search.

Creating the capacity index can include comparing a capacity of a first page with a capacity of a second page. The capacity of the second page can be added to the capacity index if the capacity of the second page is different than the capacity of the first page.

The change in capacity can be due to one or more of an adjustment in a size of the data stored on the page, an adjustment in a number of rows used on the page, and an adjustment in a number of columns used on the page.

The page directory can be an array having a plurality of cells. Each cell can be associated with a page in the table.

The page directory can be persisted to the in-memory database.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in some implementations, by storing only changes in page capacity rather than capacity values for all pages in a table, memory storage can be conserved. Moreover, because a page directory maintains a record of all possible row position values for each page in a table, the system can quickly identify the page associated with a desired row position value simply by referring to the page directory.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Further, the current subject matter is related and is directed to many aspects as described herein and, in addition, in U.S. patent application Ser. No. 14/553,950, filed concurrently herewith on Nov. 25, 2014, entitled "In-Memory Database System Providing Lockless Read and Write Operations for OLAP and OLTP Transactions," and by inventors Anil Kumar Goel, Ivan Schreter, Juchang Lee, Mihnea Andrei, the contents of which is hereby fully incorporated by reference.

Figure 1:
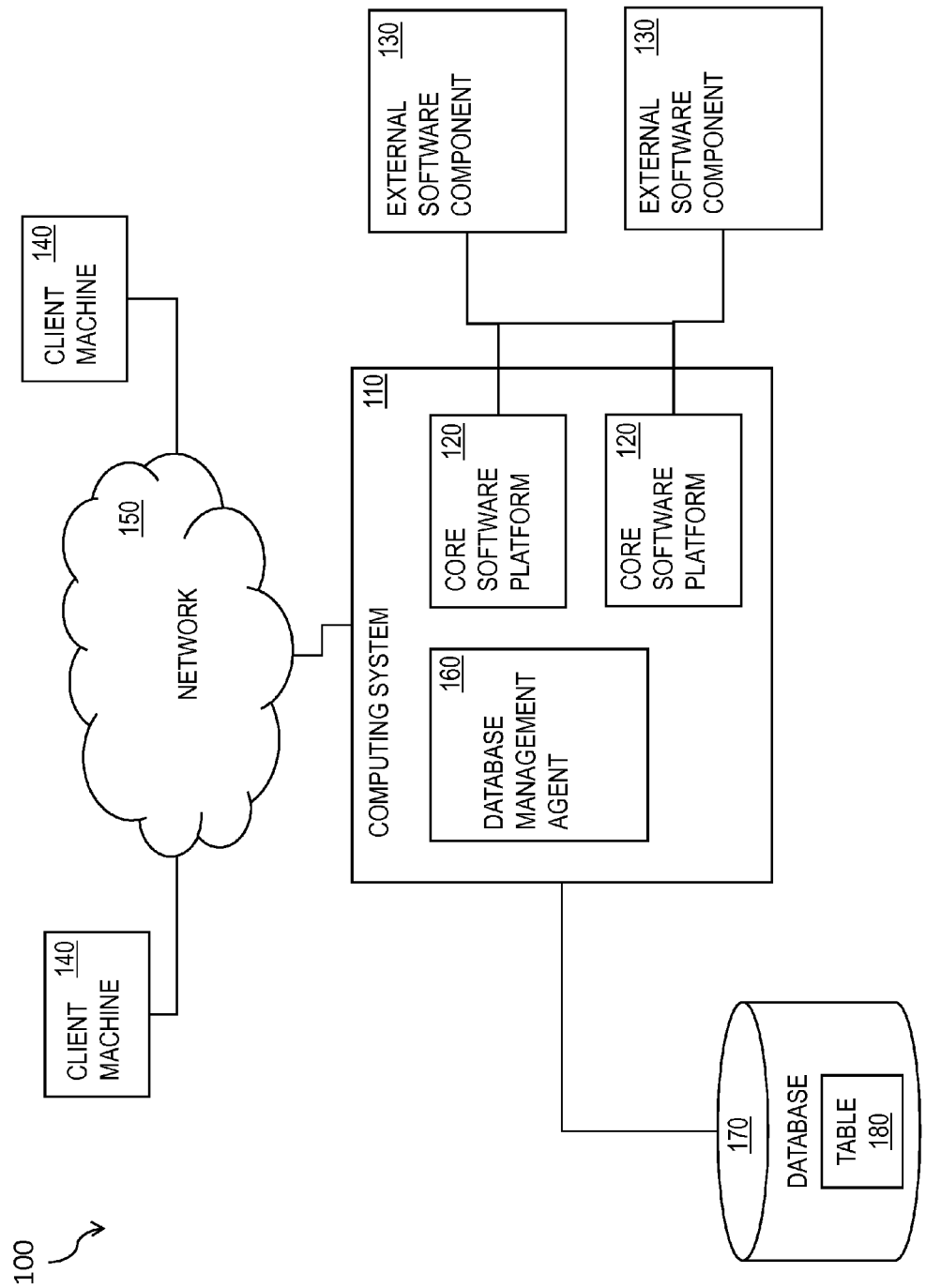
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
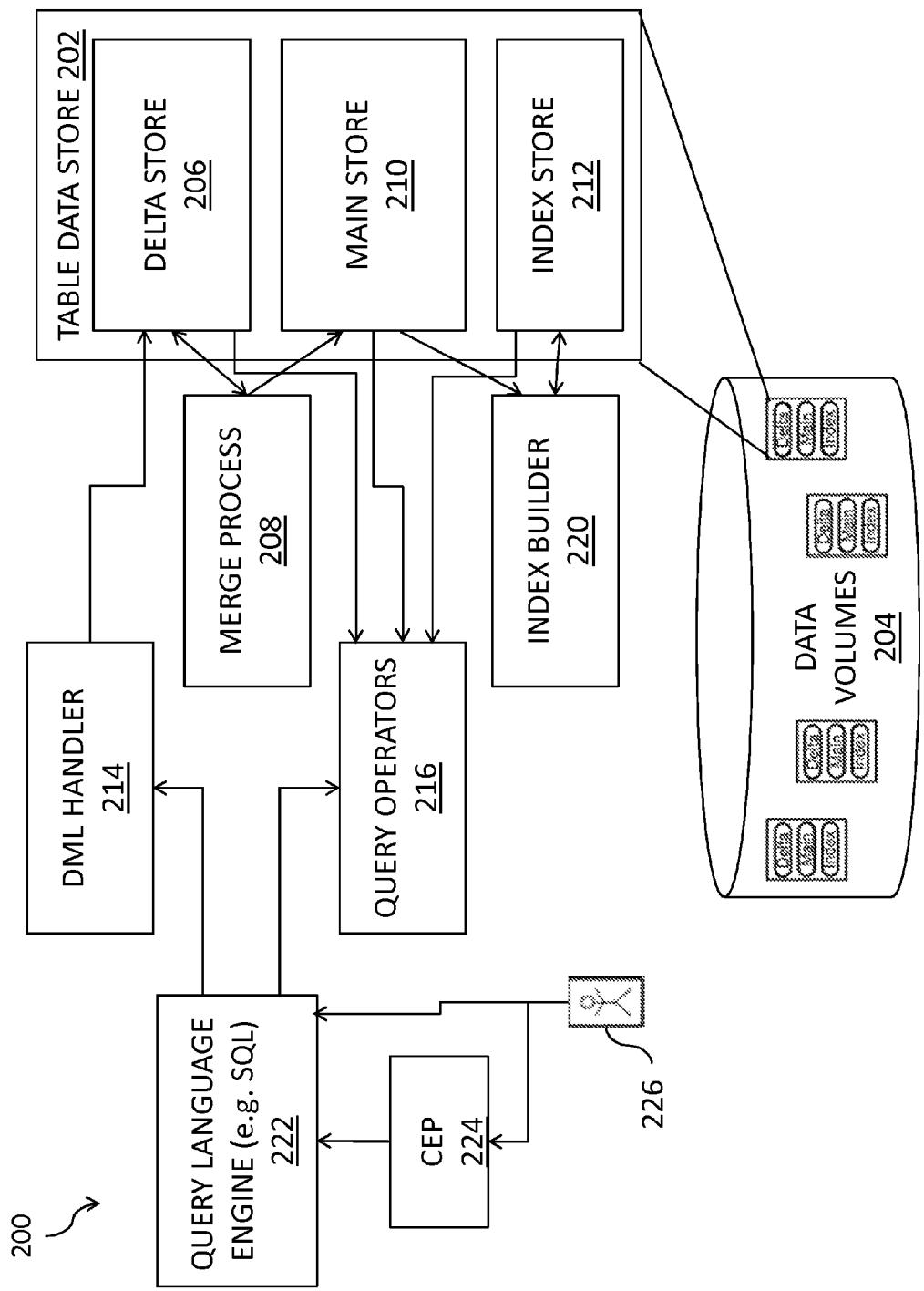
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
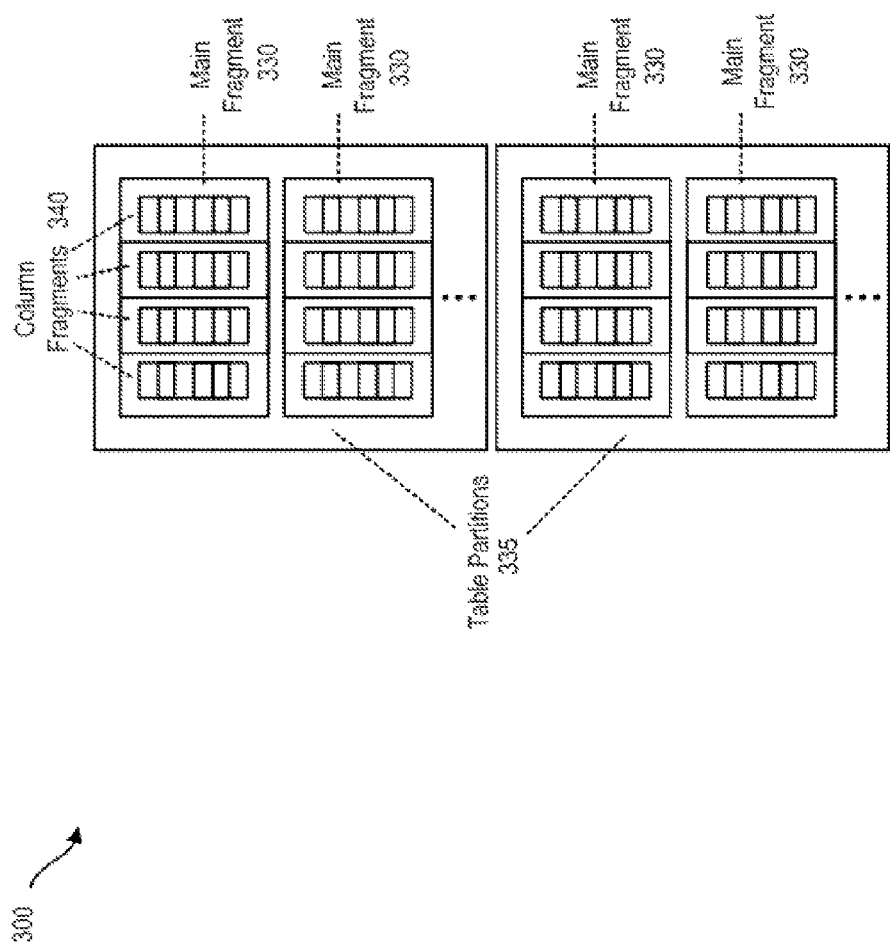
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
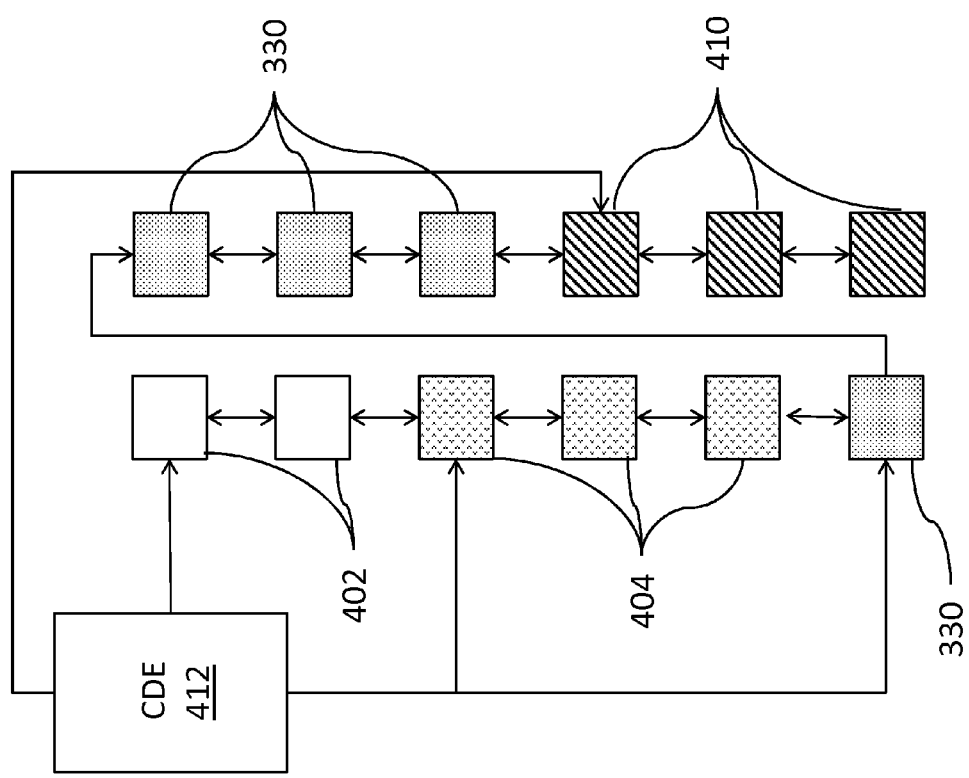
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like. While FIG. 4 illustrates a single page chain 400, multiple page chains can be used. In some implementations, the multiple page chains can be arranged in accordance with a hierarchy.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows (i.e., the row position). In some in-memory database systems, a physical identifier for a data record position or row position can be referred to as a UDIV or DocID. The row position can be the physical index of the row within the fragment. As such, row position values can generally increase and may be in sequence. Distinct from a logical RowID, the row position, UDIV, or DocID (or a comparable parameter) can indicate a physical position of a row (e.g. a data record), whereas the RowID indicates a logical position. The RowID may not always be sequential or continuous. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
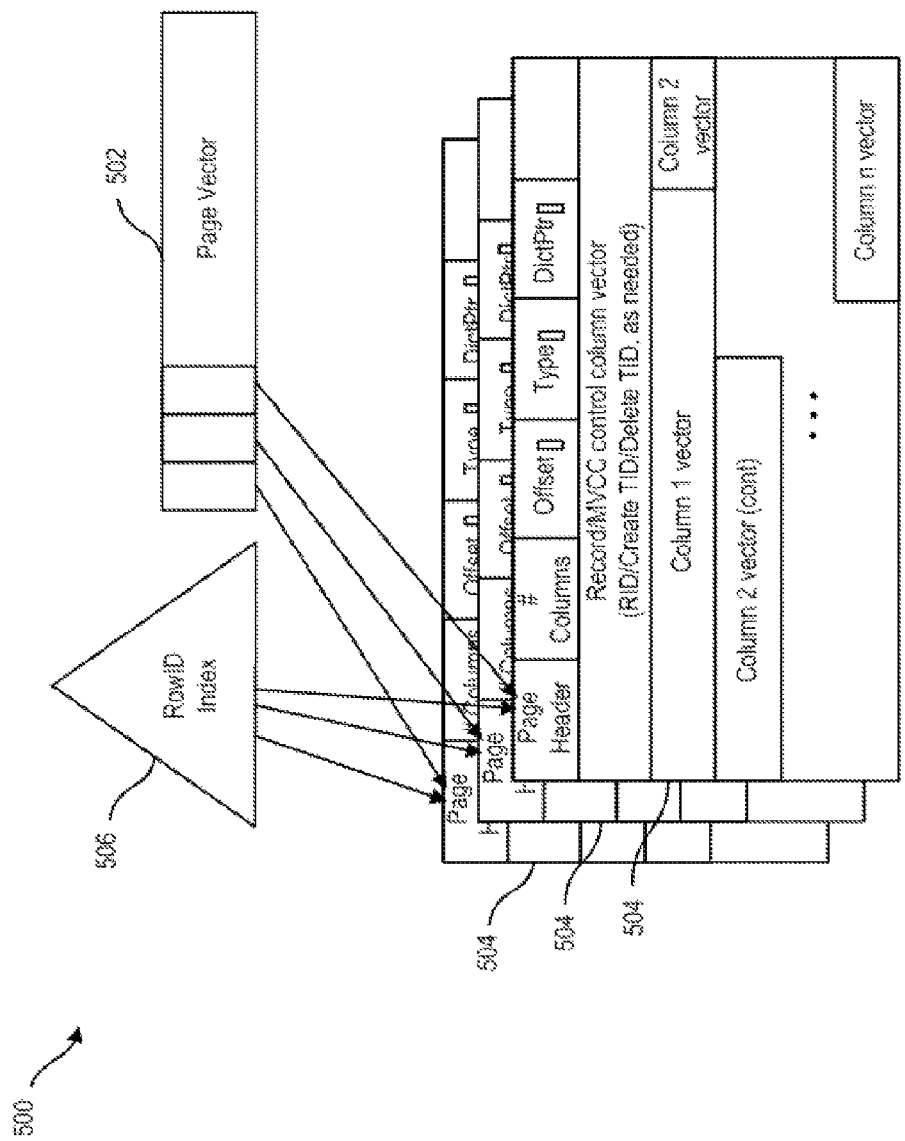
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
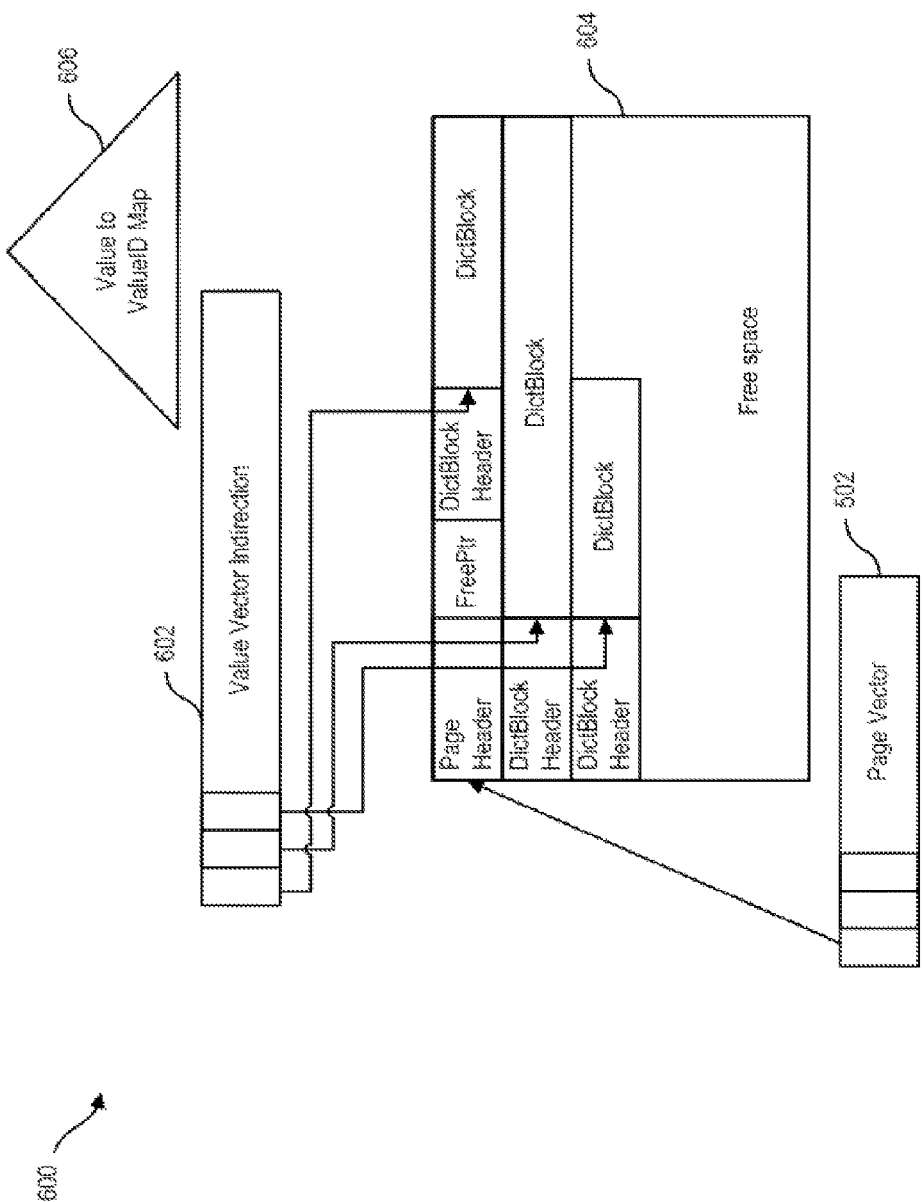
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
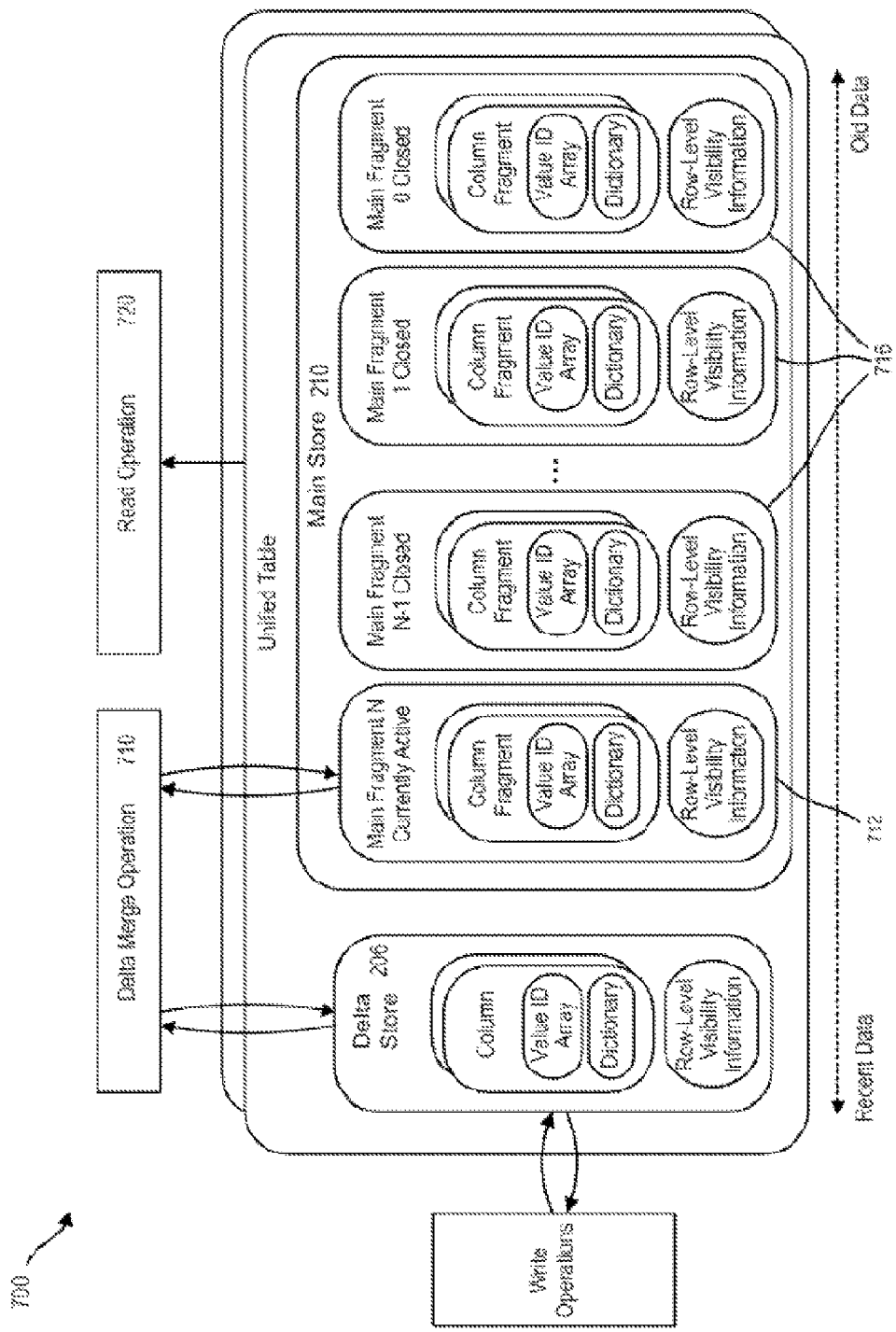
FIG. 7 is a functional block diagram illustrating a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

As explained above with respect to FIG. 2, a data table can be stored across multiple fragments which, in turn, can be distributed across a chain of pages. As a data table grows in size, it can become difficult to quickly find a desired data record within the morass of pages. In some implementations, a search can be performed based on the desired data record's row position value. For example, if each page is known to have a capacity of 100 rows, then the chain of pages associated with the table can have row position values 1-100 on a first page, 101-200 on a second page, 201-300 on a third page, and so on. If the core software platform 120 is trying to perform a read operation on a data record having a particular row position value, the core software platform can quickly determine the page that the data record is located on by dividing the desired row position value by the page capacity and rounding the quotient up. For example, if the core software platform 120 is trying to read or lookup a data record having a row position value of 230, then the core software platform can quickly determine that this record is on the third page in the chain (i.e., roundup (230/100)).

Figure 8:
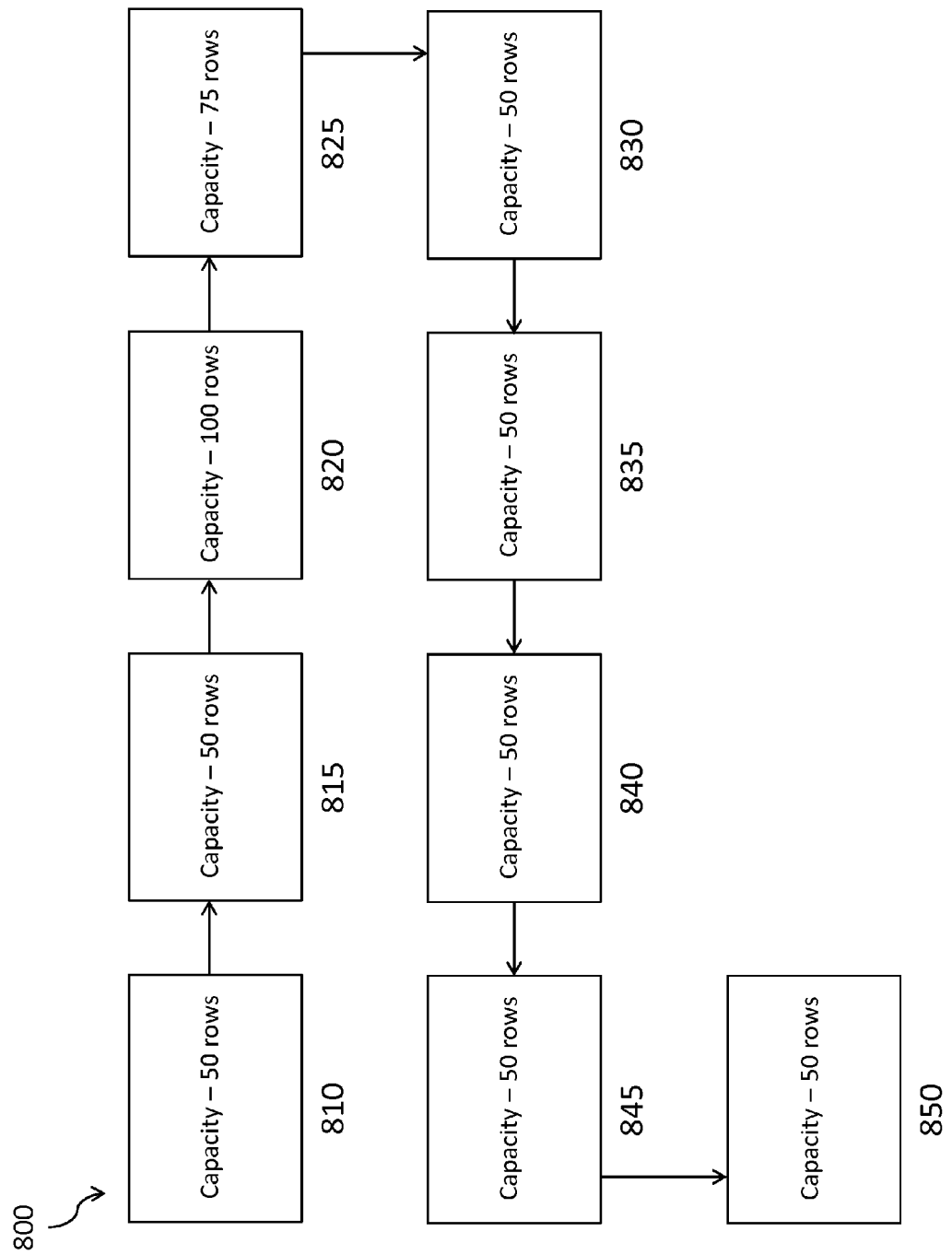
FIG. 8 is a schematic representation of a chain of pages.

In the example described above, page capacity can remain constant across all pages in the table. The lookup operation described above can become complicated, however, when page capacity varies. FIG. 8 shows a schematic representation of a chain 800 of pages 810, 815, 820, 825, 830, 835, 840, 845, and 850 which, together, form a table. In the implementation of FIG. 8, the capacity can vary between pages. Capacity can change depending, for example, on the type of data stored on the page. For example, a dictionary can use 5-bit values to encode entries. As the number of dictionary entries grows, additional bits may be required to encode these entries. If, for example, the 5-bit values are changed to 6-bit values, then the amount of data stored on the page can increase which, in turn, can increase the page's capacity. Oftentimes, capacity changes are borne from a need to provided scalable solutions. Many large business platforms (e.g., an enterprise resource planning platform) can include thousands of tables that may each only have a single row of data. In order to conserve storage space, these tables may be represented in memory using pages having a small capacity. As the number of rows or columns in these tables increases, pages having a larger capacity can be used to accommodate this growth. In the implementation for FIG. 8, for example, pages 810, 815, 830, 835, 840, 845, and 850 can have a capacity of 50 rows; page 820 can have a capacity of 100 rows; and page 825 can have a capacity of 75 rows. Given these disparate capacity values, the core software platform 120 cannot perform the simple division described above to determine the page of a desired row position value. Rather, the core software platform 120 may need to calculate the range of row position values on each page in order to find the desired row position value.

For example, if page 810 has a starting row position value of 1 and a capacity of 50 rows, then the range of row position values on this page can be 1 to 50. The range of row position values on the next page (i.e., page 815) can be determined in a similar manner. Generally, the starting row position value on a page is equal to the sum of the previous page's starting row position value and the previous page's capacity. Using this relationship, the core software platform 120 can determine that the starting row position value on page 815 is 51 (i.e., 1+50). Since page 815 has a capacity of 50 rows, then the range of row position values on this page can be 51 to 100. If, for example, the core software platform 120 is looking for a data record having a row position value within this range (e.g., 75), then the core software platform can determine that this data record is located on page 815. If, however, the desired row position value is outside of this page's range (e.g., 230), then the core software platform may need to repeat the above calculations until the desired page is found. Doing so, however, can be time consuming, especially if chain 800 includes hundreds or thousands of pages.

Rather than perform the above calculations every time a read or lookup operation is received, it may be advantageous to store the page and capacity information in a capacity index. The capacity index can record changes in page capacities. A page directory can be created from the capacity index that identifies the starting row position value for each page. When a particular row position value is needed (for a lookup operation or otherwise), the core software platform 120 can refer to the page directory to quickly find the corresponding page. The capacity index and page directory are described below with respect to FIGS. 9 and 10, respectively.

Generally, the capacity of a page is the same as the capacity in a previous page. In the implementation of FIG. 8, for example, pages 810, 815, 830, 835, 840, 845, and 850 have the same capacity (i.e., 50 rows). Rather than blindly store capacity information for each page without regard to these repeating values, the capacity index 900 of FIG. 9 may only store changes in capacity as evidenced by entries 910, 920, 930, and 940.

Entries 910, 920, 930, and 940 can represent the different points or pages at which capacity changes along chain 800. The core software platform 120 can create capacity index 900 by referring to all of pages 810, 815, 820, 825, 830, 835, 840, 845, and 850. However, only some of these pages may appear in the capacity index 900. Entry 910 can, for example, correspond to page 810. Proceeding down chain 800, the core software platform 120 can compare the capacity of page 810 to the next page 815. Because these pages have the same capacity (i.e., 50), the core software platform 120 can omit page 815 from capacity index 900 since only changes in capacity are recorded. Proceeding down chain 800, the core software platform 120 can then compare the capacity of the next pair of pages (i.e., pages 815 and 820). Because the capacity changes from 50 to 100, the core software platform 120 can add page 820 to the capacity index 900 at entry 920. Continuing down chain 800, the core software platform 120 can find additional capacity changes at pages 825 and 830 and add these changes to capacity index 900 at entries 930 and 940, respectively. Because the capacity does not change between pages 835, 840, 845, and 850, none of these pages are included in capacity index 900. By storing only changes in capacity rather than all of the capacity values associated with page chain 800, the capacity index 900 can conserve storage space.

Figures 9, 10:
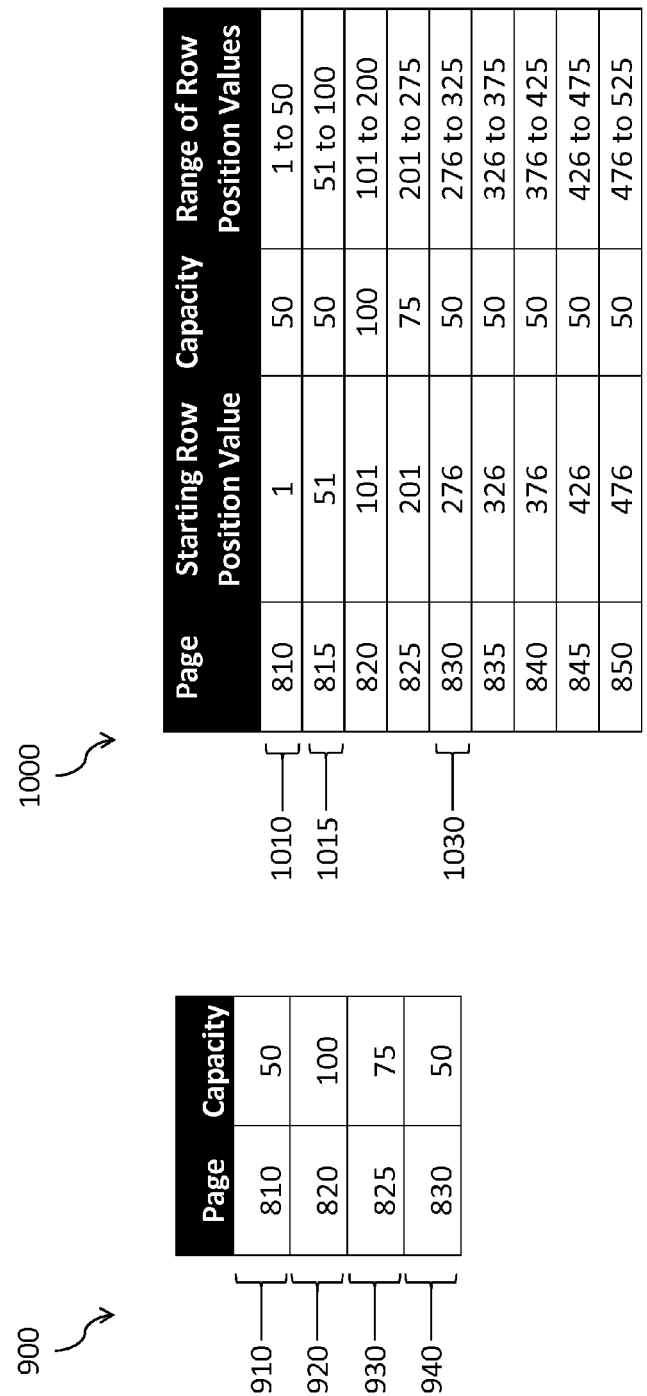
FIG. 9 is a schematic representation of a capacity index.
FIG. 10 is a schematic representation of a page directory.

The core software platform 120 can use the information in capacity index 900 to construct a page directory. FIG. 10 illustrates a schematic representation of a page directory 1000 that can be persisted to memory. Page directory 1000 can be an array that specifies the starting row position value and capacity for each page in the chain 800. Based on this information, the core software platform 120 can quickly determine the entire range of row position values associated with each page in the chain 800. For example, entry 1010, which can correspond to page 810, indicates that the starting row position value is 1 and that the page has a capacity of 50 rows. Using this information, the core software platform 120 can quickly determine that page 810 includes row position values 1 to 50.

The next entry 1015 can correspond to page 815. As described above with respect to FIG. 9, page 815 can be omitted from the capacity index 900 because its capacity is the same as the preceding page's capacity. However, since page directory 1000 includes all pages in chain 800, this page can appear in the directory notwithstanding its absence from the capacity index 900. In the implementation of FIG. 10, the starting row position value for page 815 is 51. As described above, the starting row position value is equal to the sum of the preceding page's starting row position value and the preceding page's capacity. Since the capacity of page 815 matches the capacity of the preceding page 810, the capacity of page 815 is 50, and the starting row position value is 51 (i.e., 1+50). Given these values, the core software platform 120 can quickly determine that page 815 includes row position values 51 to 100. The core software platform 120 can populate the remainder of page directory 1000 using similar calculations until all pages in chain 800 are accounted for.

The core software platform 120 can use page directory 1000 during read or lookup operations to quickly determine the location or page of a desired row position value. For example, if the core software platform 120 needs to access a data record having a row position value of 382, the core software platform can search page directory 1000 to find the data record's corresponding page. The core software platform 120 can utilize various search mechanisms including, for example, a binary search. In a binary search, the core software platform 120 can search successively smaller halves of page directory 1000 until the correct page is found. The core software platform 120 can initiate the binary search by dividing the page directory 1000 in half at entry 1030. Focusing on entry 1030, the core software platform 120 can compare this entry's starting row position value (i.e., 276) to the desired row position value (i.e., 382). Since the desired row position value is greater than this starting row position value, the core software platform 120 can deduce that the desired row position value is located on a higher numbered page (i.e., located further down page directory 1000). The core software platform 120 can divide the bottom half of page directory 1000 (i.e., below entry 830) in half and repeat the same analysis until the desired page is found. In the implementation of FIG. 10, row position value 382 can be found on page 840.

Other types of searches are possible. For example, the core software platform 120 can use a linear search to find the desired row position value. During a linear search, the core software platform 120 can start at the top of page directory 1000 and proceed down the directory until the desired page is found. Different variations are possible including, for example, the use of a reverse linear search and the like.

Figure 11:
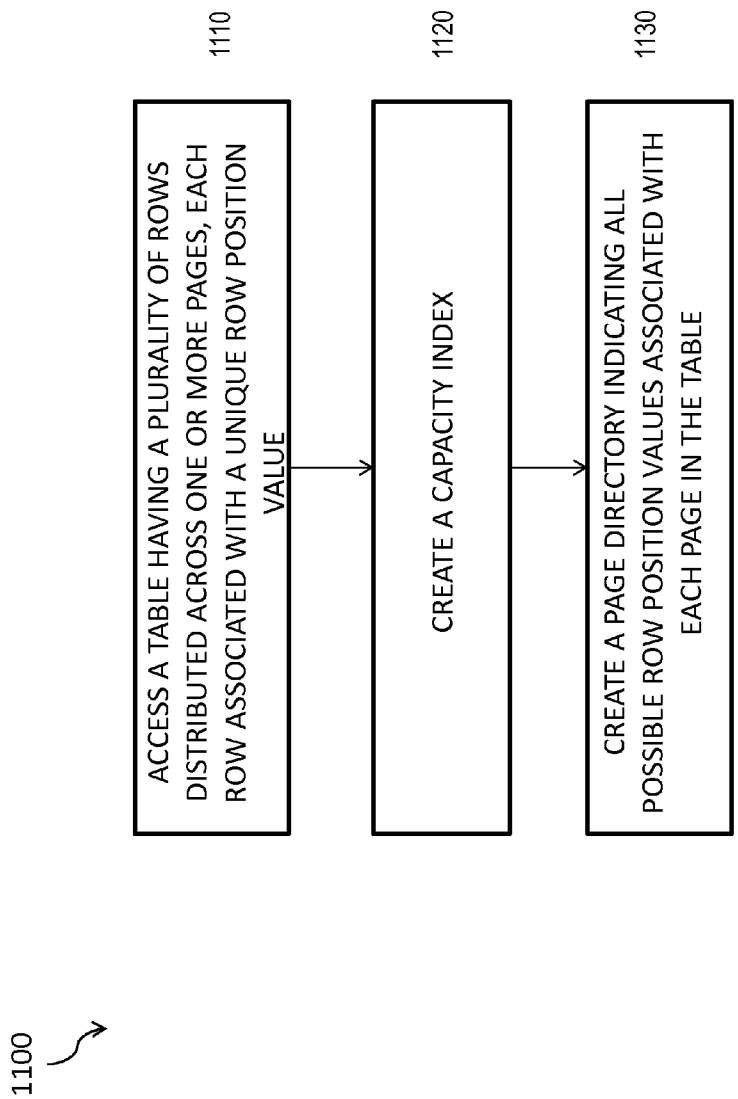
FIG. 11 is a flowchart for creating a page directory.

FIG. 11 is a flowchart 1100 for constructing a page directory in accordance with some of the implementations described herein. At 1110, the core software platform 120 can access a table. This table can have multiple rows that are distributed across multiple pages. Each of the pages can have a varying capacity (i.e., hold a different number of rows), and each of the rows can be associated with a unique row position value.

At 1120, the core software platform 120 can create a capacity index to record changes in capacity between pages of the table. Neighboring entries in the capacity index can have different capacity values, as described above with respect to capacity index 900.

At 1130, the core software platform 120 can construct a page directory based on the capacity index. The page directory can indicate all possible row position values associated with each page in the table. For example, as described above with respect to FIG. 10, the page directory 1000 can provide each page's starting row position value and capacity. Based on this information, the core software platform 120 can determine the entire range of row position values associated with each page. Searches can be performed on the page directory to find the location or page of a desired row position value.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   accessing a table stored in an in-memory database, the table having a plurality of rows distributed across one or more pages in the in-memory database, each of the plurality of rows associated with a unique row position value, and each of the one or more pages associated with a capacity representative of an amount of data stored on the page;
   creating, based at least on capacities of each of the plurality of pages in the in-memory database, a capacity index having a plurality of entries, the creation of the capacity index comprising:
      inserting, into the capacity index, an entry corresponding to a first capacity of a first page, in response to the first capacity being different than a second capacity of a second page that precedes the first page;
   creating a page directory based on the capacity index, the page directory indicating a plurality of row position values included in each of the one or more pages in the in-memory database; and
   executing, based at least on the page directory, a database query on the in-memory database, the execution of the query comprising:
      identifying, based at least on the page directory, a page that includes a row having a target row position value; and
      loading, from the in-memory database, the page that includes the row having the target row position value.

2. The method of claim 1, wherein the identifying of the page comprises searching the page directory for the target row position value.

3. The method of claim 2, wherein the searching is performed by a binary search, a linear search, or a reverse linear search.

4. The method of claim 1, wherein the creating the capacity index comprises:
   comparing a capacity of a first page with a capacity of a second page; and
   adding the capacity of the second page to the capacity index if the capacity of the second page is different than the capacity of the first page.

5. The method of claim 1, wherein the change in capacity is due to one or more of an adjustment in a size of the data stored on the page, an adjustment in a number of rows used on the page, and an adjustment in a number of columns used on the page.

6. The method of claim 1, wherein the page directory is an array having a plurality of cells, each cell associated with a page in the table.

7. The method of claim 1 further comprising:
   persisting the page directory to the in-memory database.

8. A non-transitory computer-readable medium containing instructions to configure a processor to perform operations comprising:
   accessing a table stored in an in-memory database, the table having a plurality of rows distributed across one or more pages in the in-memory database, each of the plurality of rows associated with a unique row position value, and each of the one or more pages associated with a capacity representative of an amount of data stored on the page;

creating, based at least on capacity of each of the plurality of pages in the in-memory database, a capacity index having a plurality of entries, the creation of the capacity index comprising:

inserting, into the capacity index, an entry corresponding to a first capacity of a first page, in response to the first capacity being different than a second capacity of a second page that precedes the first page;

creating a page directory based on the capacity index, the page directory indicating a plurality of row position values included in each of the one or more pages in the in-memory database; and executing, based at least on the page directory, a database query on the in-memory database, the execution of the query comprising:

identifying, based at least on the page directory, a page that includes a row having a target row position value; and loading, from the in-memory database, the page that includes the row having the target row position value.

9. The non-transitory computer-readable medium of claim 8, wherein the identifying of the page comprises searching the page directory for the target row position value in any of the one or more pages.

10. The non-transitory computer-readable medium of claim 9, wherein the searching is performed by a binary search, a linear search, or a reverse linear search.

11. The non-transitory computer-readable medium of claim 8, wherein the creating the capacity index comprises:

comparing a capacity of a first page with a capacity of a second page; and adding the capacity of the second page to the capacity index if the capacity of the second page is different than the capacity of the first page.

12. The non-transitory computer-readable medium of claim 8, wherein the change in capacity is due to one or more of an adjustment in a size of the data stored on the page, an adjustment in a number of rows used on the page, and an adjustment in a number of columns used on the page.

13. The non-transitory computer-readable medium of claim 8, wherein the page directory is an array having a plurality of cells, each cell associated with a page in the table.

14. The non-transitory computer-readable medium of claim 8, the operations further comprising:

persisting the page directory to the in-memory database.

15. A system comprising:
at least one processor; and
at least one memory, wherein the at least one processor and the at least one memory are configured to perform operations comprising:

accessing a table stored in an in-memory database, the table having a plurality of rows distributed across one or more pages in the in-memory database, each of the plurality of rows associated with a unique row position value, and each of the one or more pages associated with a capacity representative of an amount of data stored on the page;

creating, based at least on capacities of each of the plurality of pages in the in-memory database, a capacity index having a plurality of entries, the creation of the capacity index comprising:

inserting, into the capacity index, an entry corresponding to a first capacity of a first page, in response to the first capacity being different than a second capacity of a second page that precedes the first page;

creating a page directory based on the capacity index, the page directory indicating a plurality of row position values included in each of the one or more pages in the in-memory database; and executing, based at least on the page directory, a database query on the in-memory database, the execution of the query comprising:

identifying, based at least on the page directory, a page that includes a row having a target row position value; and loading, from the in-memory database, the page that includes the row having the target row position value.

16. The system of claim 15, wherein the identifying of the page comprises searching the page directory for the target row position value, the searching comprising a binary search, a linear search, or a reverse linear search.

17. The system of claim 15, wherein the creating the capacity index comprises:

comparing a capacity of a first page with a capacity of a second page; and adding the capacity of the second page to the capacity index if the capacity of the second page is different than the capacity of the first page.

18. The system of claim 15, wherein the change in capacity is due to one or more of an adjustment in a size of the data stored on the page, an adjustment in a number of rows used on the page, and an adjustment in a number of columns used on the page.

19. The system of claim 15, wherein the page directory is an array having a plurality of cells, each cell associated with a page in the table.

20. The system of claim 15, the operations further comprising:

persisting the page directory to the in-memory database.

* * * * *